United States Patent
McDougall et al.

(10) Patent No.: US 6,874,803 B2
(45) Date of Patent: Apr. 5, 2005

(54) PNEUMATICALLY ASSISTED TRACTOR TRAILER ATTACHMENT ASSEMBLY

(75) Inventors: Randy McDougall, Williamstown (CA); Barry Foshay, Lakeville (CA)

(73) Assignee: BWS Manufacturing Ltd., Centreville (CA)

( * ) Notice: Subject to any disclaimer, the term of this patent is extended or adjusted under 35 U.S.C. 154(b) by 0 days.

(21) Appl. No.: 10/284,879

(22) Filed: Oct. 31, 2002

(65) Prior Publication Data

US 2004/0084874 A1 May 6, 2004

(51) Int. Cl.[7] .............................................. B62D 53/06
(52) U.S. Cl. ............................. 280/441.2; 280/425.2; 280/477
(58) Field of Search ............................ 280/400, 423.1, 280/425.1, 425.2, 427, 441.2, 477; 414/482

(56) References Cited

U.S. PATENT DOCUMENTS

| | | | | |
|---|---|---|---|---|
| 2,590,181 A | * | 3/1952 | Keesler | 414/481 |
| 3,874,696 A | | 4/1975 | Gardner et al. | 280/150.5 |
| 4,113,274 A | | 9/1978 | Vahrenkamp | 280/475 |
| 4,219,211 A | | 8/1980 | Sauers | 280/425 |
| 4,513,987 A | * | 4/1985 | Whitaker | 280/441.2 |
| 5,415,425 A | * | 5/1995 | Zerbe et al. | 280/441.2 |

* cited by examiner

Primary Examiner—Lesley D. Morris
Assistant Examiner—Matthew Luby
(74) Attorney, Agent, or Firm—Baker & Daniels

(57) ABSTRACT

A gooseneck for connecting a tractor and a trailer for transportation includes a support arm. The support arm has a first end that is pivotally coupled to a fifth wheel of the tractor. The support arm is pivotable to raise and lower a second end of the support arm relative to a tractor bed. A generally downwardly extending portion is coupled to the second end of the support arm for releasably attaching to a forward end of the trailer. A pneumatic assembly is coupled to the support arm. The pneumatic assembly is in communication with the tractor bed to lift and lower the generally downwardly extending portion relative to the tractor bed.

8 Claims, 12 Drawing Sheets

PNEUMATICALLY ASSISTED TRACTOR TRAILER ATTACHMENT ASSEMBLY

FIELD OF THE INVENTION

The present invention relates generally to a tractor trailer attachment assembly, and in particular a gooseneck having pneumatically assisted movement.

BACKGROUND OF THE INVENTION

The combination of a tractor hauling a trailer is typically used to transport heavy equipment, such as construction or farm equipment, for example. The trailer generally includes a flat loading platform onto which heavy equipment is loaded and rear wheels. The tractor includes the usual driving features and power sources and a fifth wheel. A gooseneck connects the tractor to the trailer. The gooseneck typically comprises an upstanding generally vertical section adapted to be releasably secured to a front portion of the trailer and a generally horizontal beam secured to the top part of the upstanding section and extending forwardly to connect in an articulating manner with the fifth wheel of the tractor. The gooseneck is detachable from the trailer, which allows operators to load heavy equipment onto the front end of the trailer.

Traditionally, goosenecks were attached to trailers using hydraulic detachable units, which included at least one hydraulic cylinder. In order to operate the hydraulic cylinders, the tractor would need to include hydraulic attachments or alternatively, the trailer would include a self-contained power pack. A disadvantage of using hydraulic cylinders is an undesirable increase in the trailer tare weight. This is a concern for oversized equipment due to limitations in the allowable weight permits available.

Hydraulic detachable units have a further disadvantage in that hydraulic units are subject to environmental regulations. If hoses carrying hydraulic fluid rupture or cylinders leak, fixing or replacing these items can be costly. Further, there is potentially environmental liability associated with hydraulic oil spills or leaks.

Mechanical detachable goosenecks were developed in order to overcome the disadvantages associated with hydraulic detachable units. Mechanical detachable goosenecks are hooked to and unhooked from trailers using a ramming force that is exerted by driving the tractor toward or away from the trailer. When the gooseneck is detached from the trailer, blocks must be placed between the gooseneck and the tractor bed in order to maintain the gooseneck at the required height for re-attachment to the trailer. Blocks are also placed between the trailer and the ground in order to maintain the trailer at the required height. As a result, a ramp must be placed at the front end of the trailer to facilitate loading of heavy equipment onto the trailer.

Any movement of either set of blocks causes re-attachment of the gooseneck and trailer to be very difficult. If there is any movement of the blocks, manual jacking of the gooseneck or trailer must be performed in order to properly position the components for re-attachment. Often several attempts are required before an operator manages to successfully re-attach the gooseneck and the trailer. This is inefficient and increases the time necessary for loading and unloading of equipment. In addition, damage to the tractor, trailer or equipment carried on the trailer may occur during detachment or re-attachment of the gooseneck.

When detaching and re-attaching the goosenecks of the prior art, operators were required to unhook gooseneck safety pins and electrical or air connections, which were located underneath the trailer. Accessing these connections at this location posed a safety hazard for operators. Therefore, it is desirable to unhook and re-hook these connections from a safe location beside the tractor trailer.

It is therefore an object of the present invention to provide a tractor trailer attachment assembly that obviates or mitigates at least one of the above disadvantages.

SUMMARY OF THE INVENTION

According to an aspect of the present invention there is provided a gooseneck for connecting a tractor and a trailer for transportation, the gooseneck comprising:

a support arm having a first end, the first end being coupled to a fifth wheel of the tractor, the support arm being pivotable about the first end to raise and lower a second end of the support arm relative to a tractor bed;

a generally downwardly extending portion coupled to the second end of the support arm, the generally downwardly extending portion for releasably attaching to a forward end of the trailer; and a pneumatic assembly coupled to the support arm, the pneumatic assembly being in communication with the tractor bed to raise and lower the generally downwardly extending portion relative to the tractor bed.

According to another aspect of the present invention there is provided a tractor-trailer attachment assembly comprising:

a gooseneck coupled to a fifth wheel of a tractor, the gooseneck having a support arm having a generally downwardly extending portion located at a distal end thereof, the generally downwardly extending portion including a generally horizontally extending strut;

a first pneumatic assembly coupled to an underside of the support arm, the pneumatic assembly being actuable to abut a tractor bed of the tractor to raise and lower the generally downwardly extending portion relative to a forward end of a trailer; and a hook assembly coupled to a forward end of the trailer, the hook assembly having a forwardly extending hook for engaging the generally horizontally extending strut of the gooseneck;

wherein the gooseneck is movable by the first pneumatic assembly to bring the generally horizontally extending strut into and out of engagement with the forwardly extending hook.

According to yet another aspect of the present invention there is provided a method for detaching a gooseneck, mounted on a tractor, from a trailer comprising:

actuating a second pneumatic assembly to move a hook assembly located at a forward end of the trailer relative to the ground, the second pneumatic assembly being coupled to the forward end of the trailer and including at least one ground support for contacting the ground to force the hook assembly of the trailer to move upwards;

actuating a first pneumatic assembly to move a generally horizontally extending strut that is coupled to a downwardly extending portion of the gooseneck, the pneumatic assembly extending between a bed of the tractor and an underside of the gooseneck; and moving the tractor away from the trailer once the hook assembly is dis-engaged from the generally horizontally extending strut.

The present invention provides an advantage in that the gooseneck can be attached and detached without requiring a ramming force, which can damage the tractor, trailer, or the load being carried by the trailer.

The present invention provides a further advantage in that the operator can adjust the height of the gooseneck and trailer relative to the ground without requiring the use of blocks.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENTS

Figure 1:
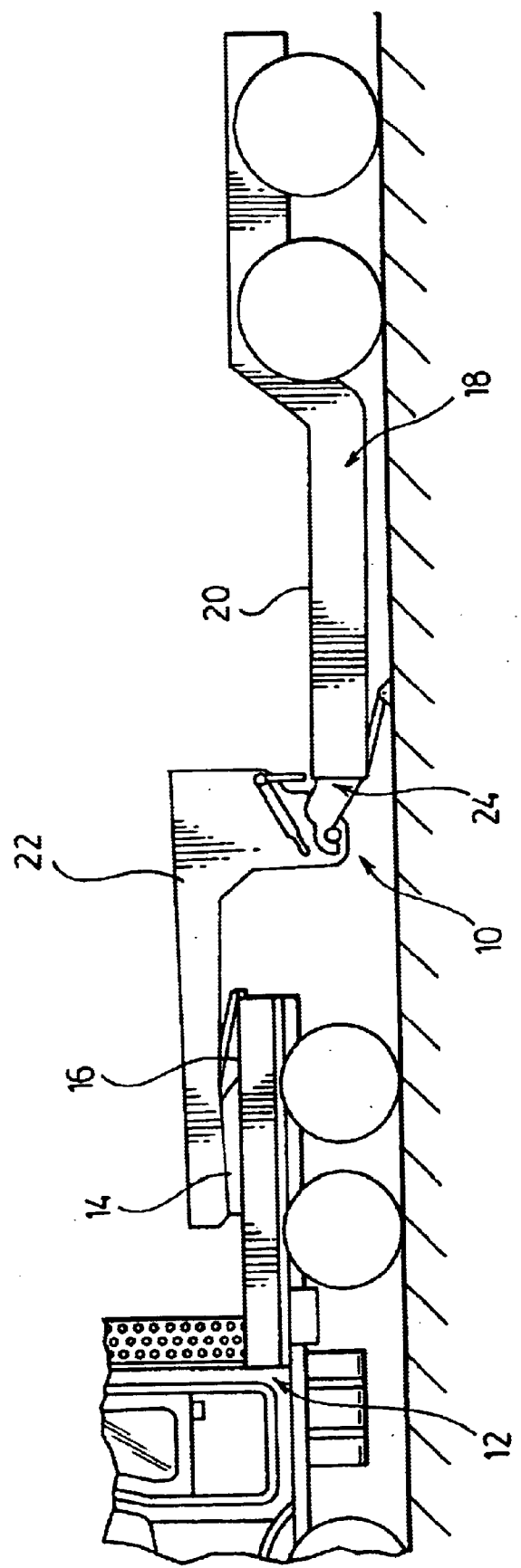
FIG. 1 is a schematic side view of a tractor and a trailer coupled to one another by a tractor trailer attachment assembly according to the present invention.

Referring now to FIG. 1, a tractor trailer attachment assembly 10 for securing a tractor 12 to a trailer 18 is generally shown. The tractor 12 is of conventional construction and includes a fifth wheel 14 and a tractor bed 16. The trailer 18 is also of conventional construction and includes a trailer bed 20 for transporting heavy equipment such as construction vehicles, for example.

The tractor trailer attachment assembly 10 generally comprises a gooseneck 22 and a hook assembly 24. The gooseneck 22 is coupled to the fifth wheel 14 and extends beyond the rear end of the tractor 12. The hook assembly 24 is provided at a forward end of the trailer 18 for engaging the gooseneck 22 to selectively couple the tractor 12 to the trailer 18.

Figure 2:
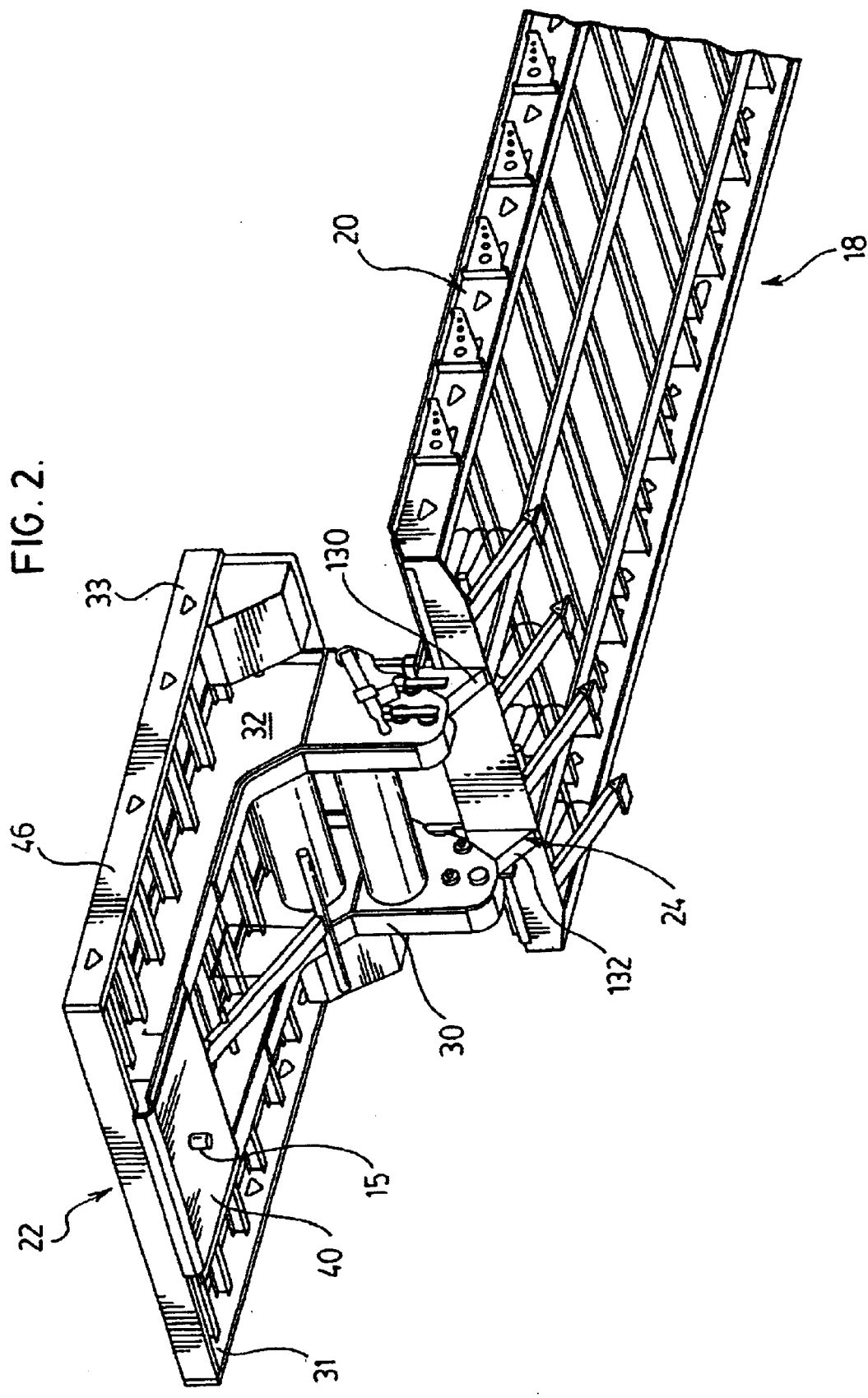
FIG. 2 is a side isometric view of the tractor trailer attachment assembly of FIG. 1.
Figure 3:
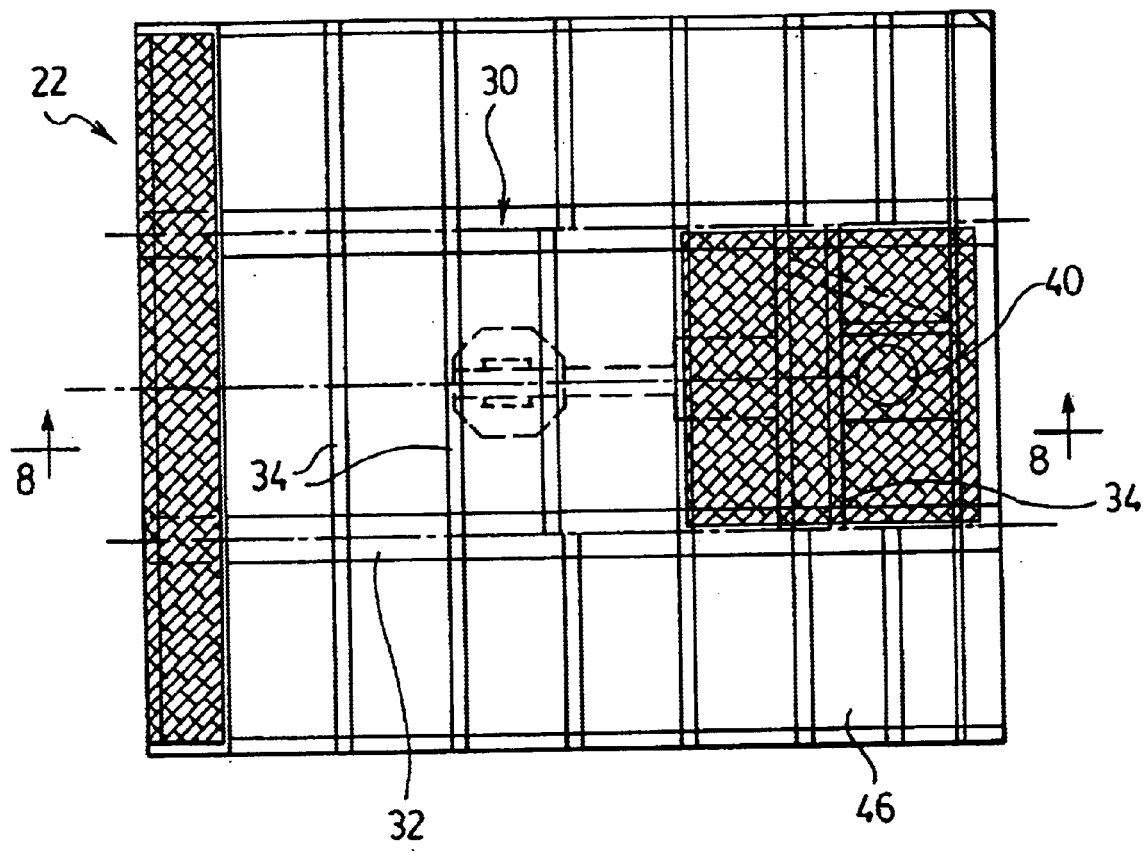
FIG. 3 is a top view of a gooseneck of the tractor trailer attachment assembly of FIG. 2.

Referring to FIGS. 2 and 3, the tractor trailer attachment assembly can be seen in greater detail. The gooseneck 22 comprises a pair of support arms 30 and 32 that are offset from one another. The support arms 30, 32 are secured to one another and to outside rails 31, 33 by cross members 34, which are welded thereto. As shown, the cross members 34 are I beams, however, beams having any suitable cross-section may be used.

A fifth wheel pin 15 extends downwardly from a fifth wheel plate assembly 40 that is coupled to the forward end of the gooseneck 22. The fifth wheel plate assembly 40 is welded to the forward end of the support arms 30, 32. The fifth wheel pin 15 mates with the fifth wheel 14 of the trailer 12 to secure the gooseneck 22 to the trailer 12. The fifth wheel plate assembly 40 is of conventional construction and is well known in the field of tractor-trailers and will not be described further.

A cover plate 46 is provided to cover the fifth wheel plate assembly 40. The cover plate 46 is welded to the support arms 30, 32.

Figure 4:
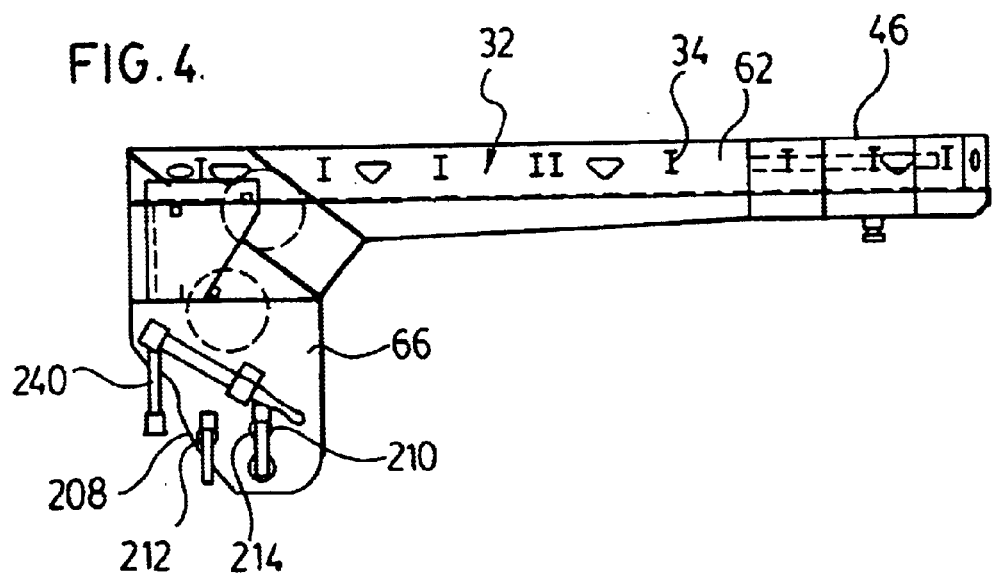
FIG. 4 is a side elevational view of the gooseneck of FIG. 3.
Figure 5:
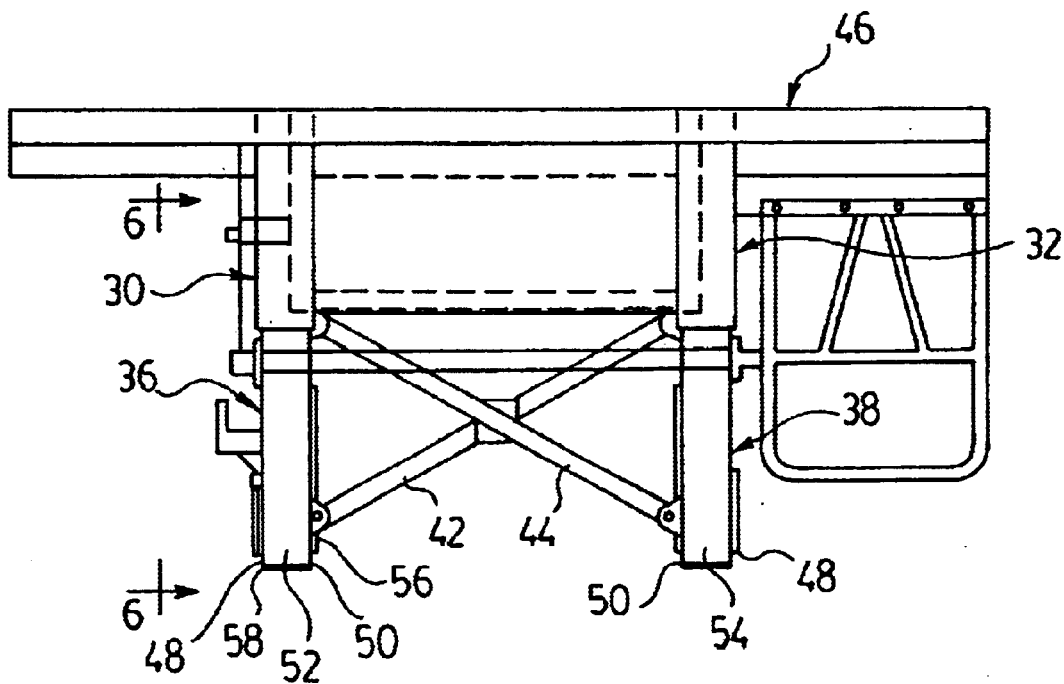
FIG. 5 is a rear view of the gooseneck of FIG. 3.

Each support arm 30, 32 comprises a generally horizontally extending portion 60, 62 and a generally downwardly extending portion 64, 66, as shown in FIG. 4. Each support arm 30, 32 further includes an outer member 48 and an inner member 50, shown in FIG. 5. The outer and inner members 48, 50 are offset from one another and are generally identical in shape. The outer and inner members 48, 50 are welded to one another. Alternatively, the outer and inner members may be coupled to one another by fasteners.

First and second braces 42 and 44, respectively, extend between the generally downwardly extending portions 36, 38 of the inner support members 50. The braces 42, 44 are secured together by a fastener (not shown) at the location where the braces 42, 44 cross one another.

Apertures 56 and 58 are provided in the inner and outer members 50, 48, respectively, of each support arm 30, 32. Generally horizontally extending struts 52, 54 are mounted in the apertures 56, 58 of each support arm 30, 32. The generally horizontally extending struts 52, 54 are provided for mating with hooks 130 and 132, respectively, of the hook assembly 24 of the trailer 18.

Figure 6:
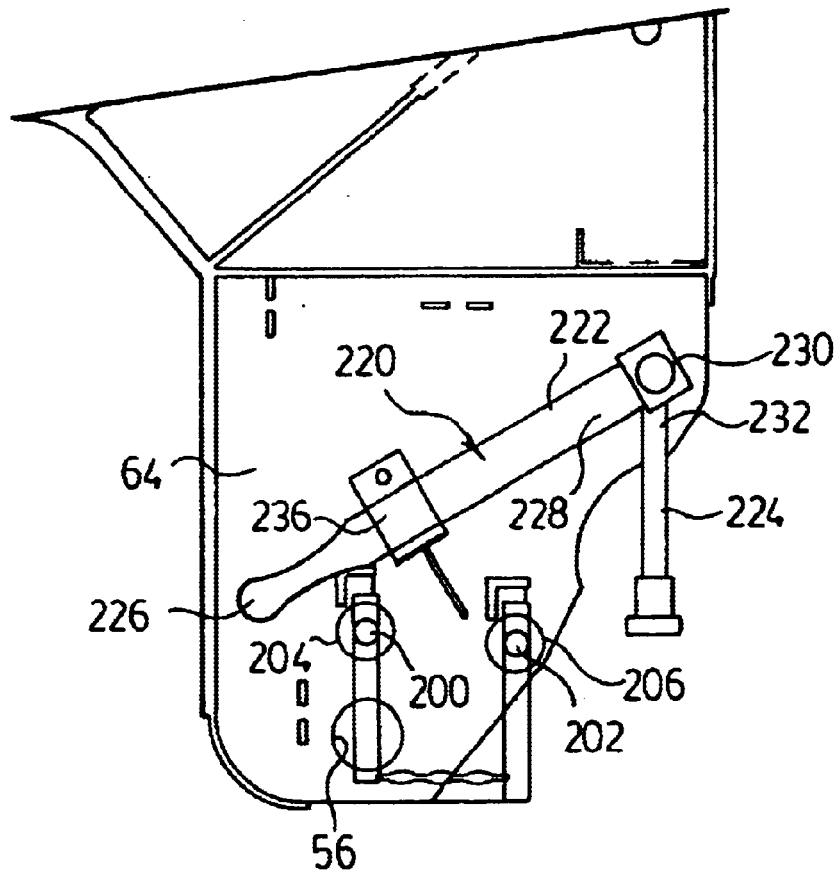
FIG. 6 is a view on 6—6 of FIG. 5.
Figure 7:
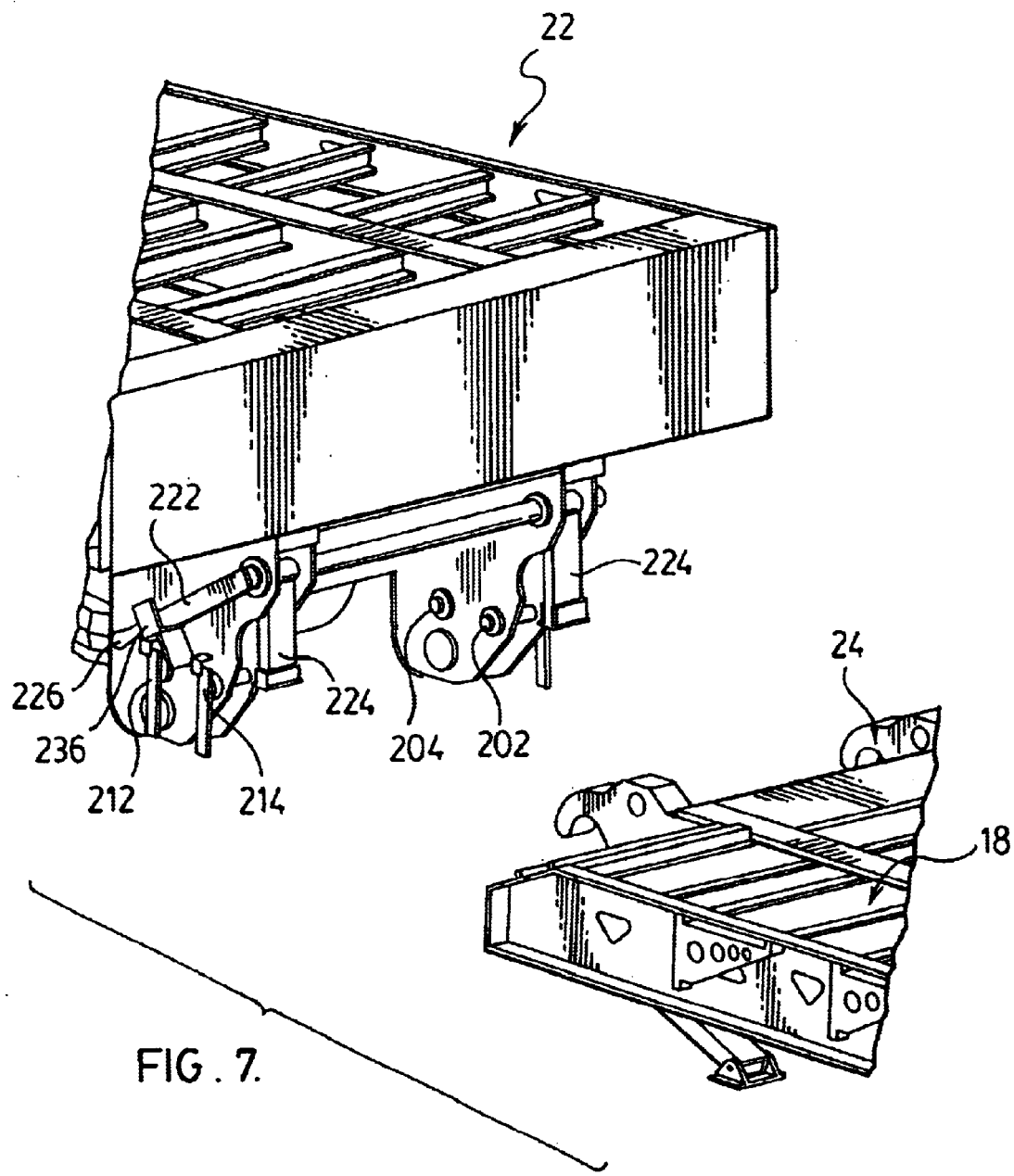
FIG. 7 is a rear isometric view of the tractor trailer attachment assembly according to the present invention in a detached position.

Referring to FIGS. 6 and 7, a pair of removable safety lock pins 200 and 202 are shown. The removable safety lock pins 200 and 202 extend through apertures 204 and 206, respectively, of the downwardly extending portion 64 of the support arm 30. A generally identical pair of apertures 208 and 210 are provided in the downwardly extending portion 66 of support arm 32, shown in FIG. 4, for receiving removable safety lock pins 212 and 214. The two pairs of safety lock pins inhibit movement of the hooks 130 and 132 of the trailer 18 when coupled to the generally horizontally extending struts 52, 54 of the gooseneck 22.

Still referring to FIGS. 6 and 7, a paddle handle assembly 220 is shown. The paddle handle assembly 220 is pivotally coupled to the downwardly extending portion 64 of the support arm 30. The paddle handle assembly 220 includes a paddle handle 222 and a locking strut 224. The paddle handle 222 includes a grip 226 for handling by an operator and a second end 228. The second end 228 of the paddle handle 222 is coupled to a first end 232 of the locking strut 224 by a paddle handle pin 230 to allow the paddle handle 222 and locking strut 224 to rotate as a single unit. The paddle handle pin 230 is pivotally mounted in an aperture (not shown) that is provided in the downwardly extending portion 64. The locking strut 224 is for engaging the hook 130 of the trailer 18 when the hook 130 is coupled to the generally horizontally extending strut 52 of the gooseneck 22. Removable spacers (not shown) are provided to lengthen the locking strut 224 and adjust the height of the trailer bed 20, which is advantageous when carrying high loads.

A bracket 236 is coupled to the downwardly extending portion 64 to receive the paddle handle 222. The paddle handle 222 rests in the bracket 236 when the locking strut 224 is in the locked position. The paddle handle 222 is rotated in the clockwise direction to move the locking strut 224 from the locked position to the unlocked position. A generally identical paddle handle assembly 240 is coupled to the downwardly extending portion 66 of support arm 32, as shown in FIG. 3. The paddle assembly 240 is generally a mirror image of the paddle assembly 220 and therefore will not be described in further detail.

Figure 8:
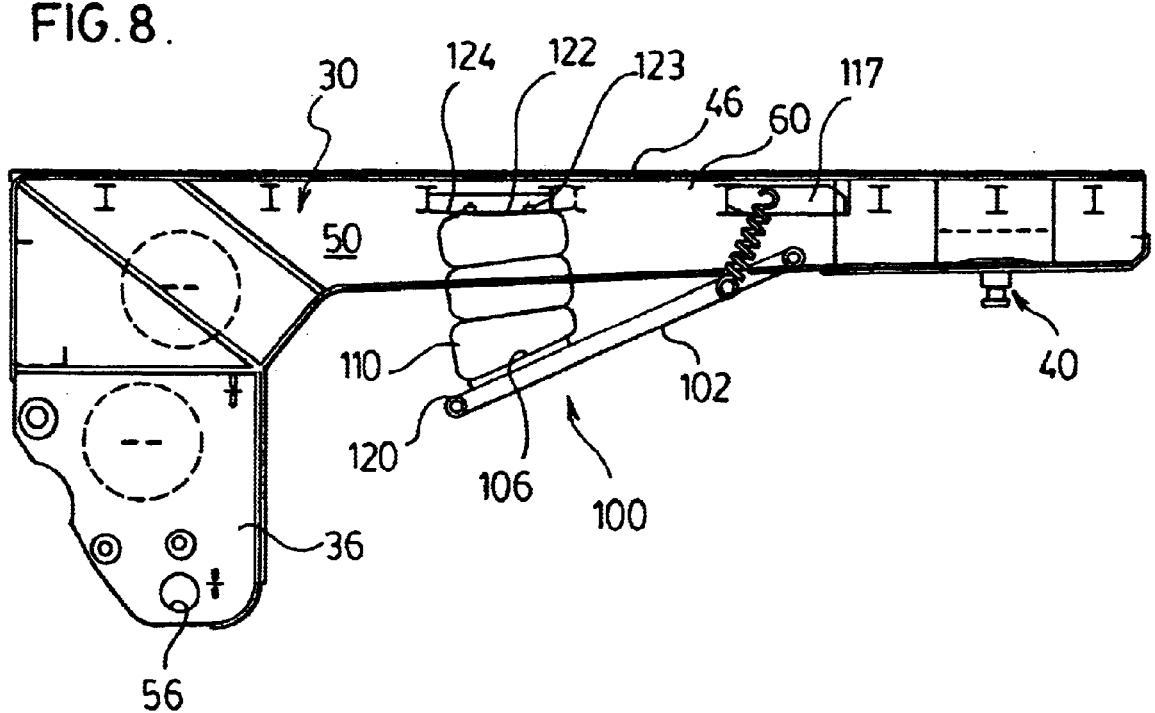
FIG. 8 is a view on 8—8 of FIG. 3.

A first pneumatic assembly 100, shown in FIG. 8, comprises an expandable bladder 110, or air cell, that is coupled to a stinger 102 at a first end 120 thereof. The bladder 110 is coupled, by fasteners 123, at a second end 122 to support plate 124 that is welded to the cross members 34. The expandable bladder 110 is comprised of a heavy elastic material, such as convoluted rubber, for example, however, other suitable materials could also be used. The bladder 110 is in communication with an air compressor (not shown). Typically, the bladder 110 is linked to the same air compressor used to power the air brakes of the tractor 12 and trailer 18. In this case, additional air tanks may be provided to ensure that the operation of the pneumatic assembly does not starve the brake system of the trailer and comply with Federal vehicle standards and regulations.

Figure 9:
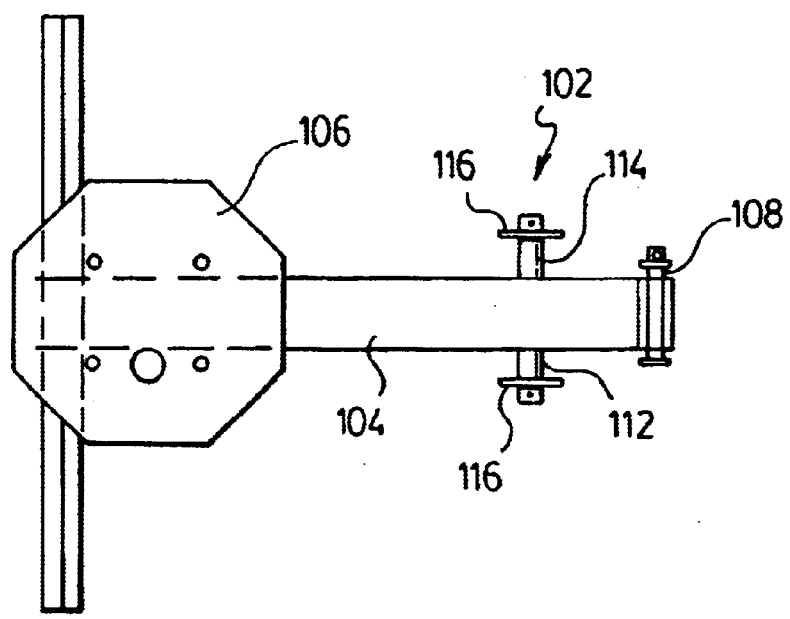
FIG. 9 is a top view of a stinger arm of the gooseneck.

Referring to FIG. 9, the stinger 102 includes a stinger arm 104 and an enlarged stinger head 106. The stinger arm 104 is pivotable about a pin 108 that extends through a first end of the stinger arm 104. The ends of the pin 108 are coupled to a pair of plates (not shown), which are welded to the cross members 34. Springs 116 extend between projections 112 and 114, which extend from opposing sides of the stinger arm 104, and removable pins (not shown) that extend outwardly from a shaft 117, which is welded to cross members 34. The springs 116 are biased to return the stinger 102 to a generally horizontal position in which the stinger arm 104 is generally aligned with the underside of the support arms 30, 32.

Figure 10:
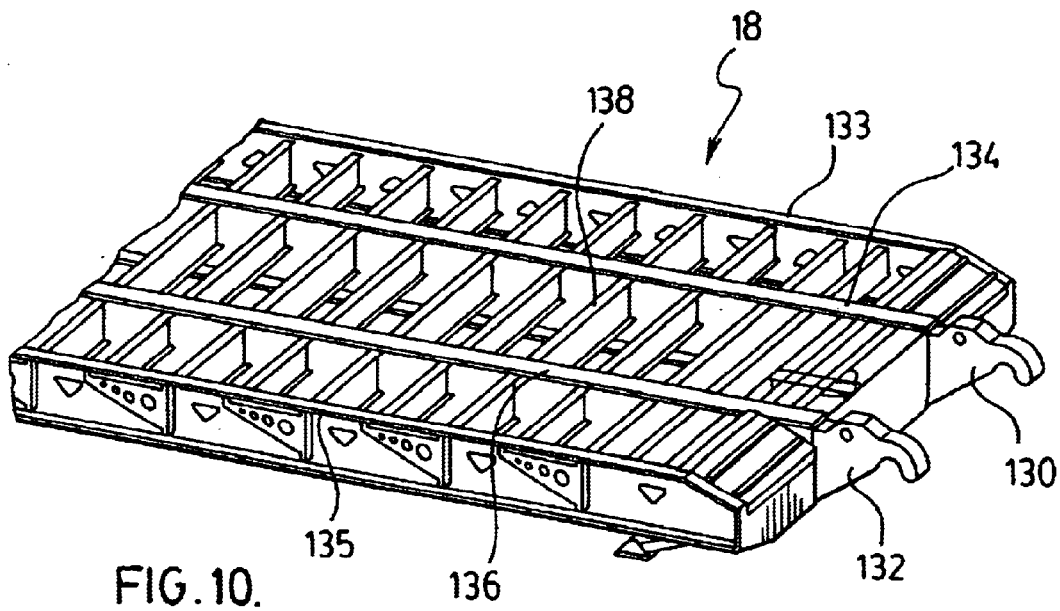
FIGS. 10 and 11 are isometric views of the trailer according to the present invention.
Figure 11:
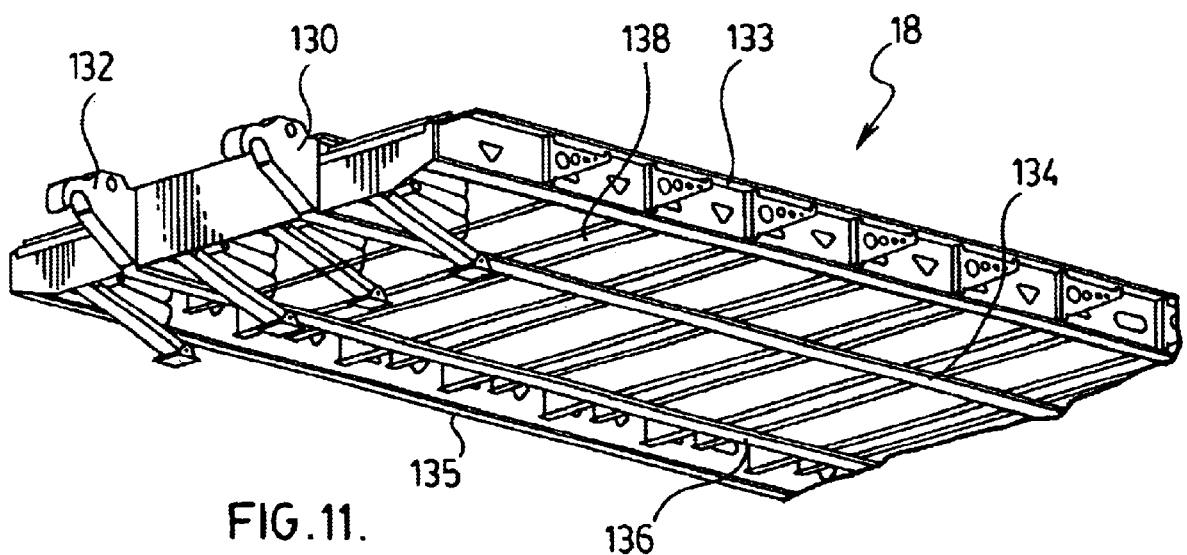

Referring now to FIGS. 10 and 11, the trailer 18 is shown. The trailer 18 comprises a pair of main trailer beams 134 and 136 that are offset from one another. The main trailer beams 134, 136 are secured to one another and to outside rails 133, 135 by trailer cross members 138, which are welded thereto. As shown, the trailer cross members 138 are I beams having a greater depth than the cross members 34 of the gooseneck 22. This is necessary to support the heavy loads carried on the trailer bed 20. The hook assembly 24, which includes a pair of hooks 130 and 132, extends from the forward end of the trailer 18. The hooks 130, 132 are welded to the main trailer beams 134, 136.

Figure 12:
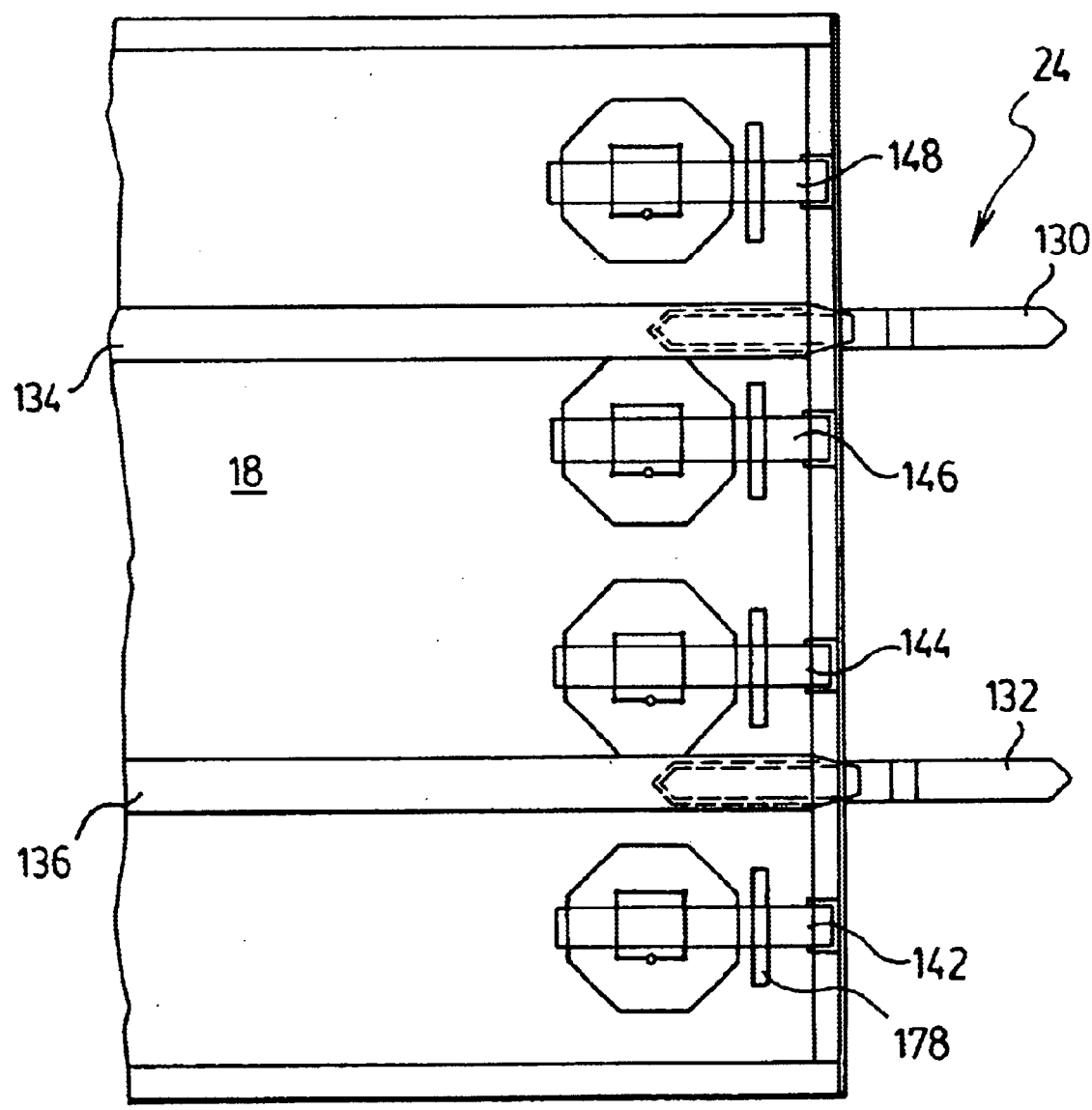
FIG. 12 is top view of a hook assembly of the tractor trailer attachment assembly of FIGS. 10 and 11.
Figure 13:
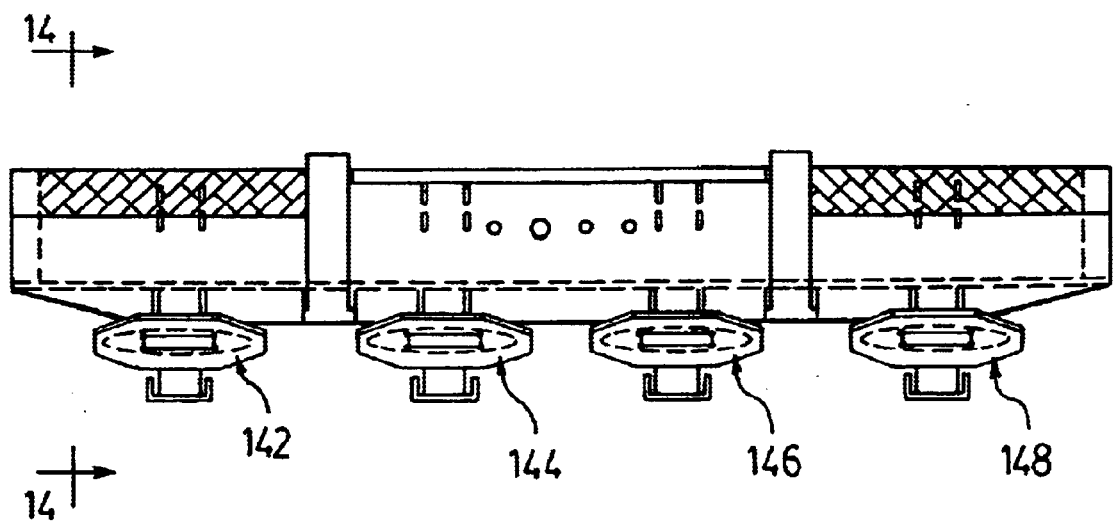
FIG. 13 is front view of the hook assembly of FIG. 12.
Figure 14:
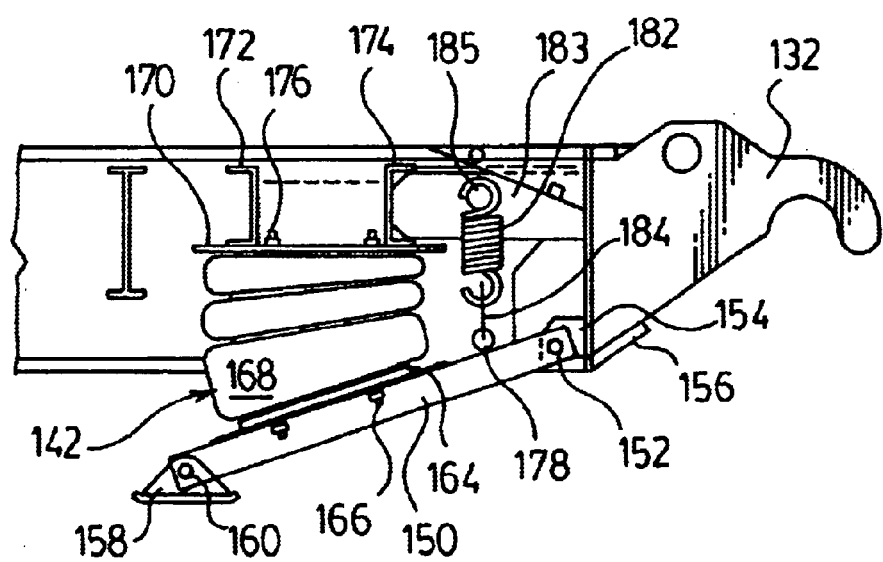
FIG. 14 is a view on 14—14 of FIG. 13.

Referring to FIGS. 12 to 14, a second pneumatic assembly 140 is coupled to the underside of the trailer 18. The second pneumatic assembly 140 includes four lifting units 142, 144, 146 and 148 that are spaced along the underside of the trailer 18. The lifting units 142, 144, 146 and 148 are in communication with the air compressor of the tractor 12 through air lines (not shown).

Each lifting unit 142, 144, 146 and 148 includes a second inflatable bladder 168 that extends between a mounting plate 170 and a lifting arm 150. The second inflatable bladder 168 is similar in construction to the inflatable bladder 110 of the first pneumatic assembly 100. The mounting plate 170 is coupled to a pair of beams 172 and 174 that are welded to the main trailer beams 134, 136 and the outside rails 133, 135. The second inflatable bladder 168 is coupled to the mounting plate 170 by fasteners 176.

The second inflatable bladder 168 is coupled to a second enlarged head 164 of the lifting arm 150 and is secured to the lifting arm through fasteners 166. The lifting arm 150 is pivotable about a first pin 152 that extends through a first end of the lifting arm 150. The first pin 152 is coupled to a flange 154 that extends from a lower plate 156, which is welded to the underside of the trailer 18. A ground support 158 is pivotally coupled to a second end of the lifting arm 150 through a second pin 160. The ground support 158 contacts a ground surface (not shown) located below the trailer 18.

A lifting arm projection 178 extends through lifting arm 150 adjacent the first end thereof. Springs 182 and 184 extend between opposing ends of a shaft 185, which is welded to a plate 183 that in turn is welded to beam 174, and the lifting arm projection 178. The springs 182 and 184 bias the lifting arm 150 toward the underside of the trailer 18 to move the ground support 158 out of contact with the ground surface. Both the lifting arm projection 178 and the shaft 185 include removable pins (not shown) to allow for spring replacement.

It will be appreciated that the first and second pneumatic assemblies 100 and 140, respectively, may use pneumatic air cylinders instead of inflatable bladders.

Figure 15:
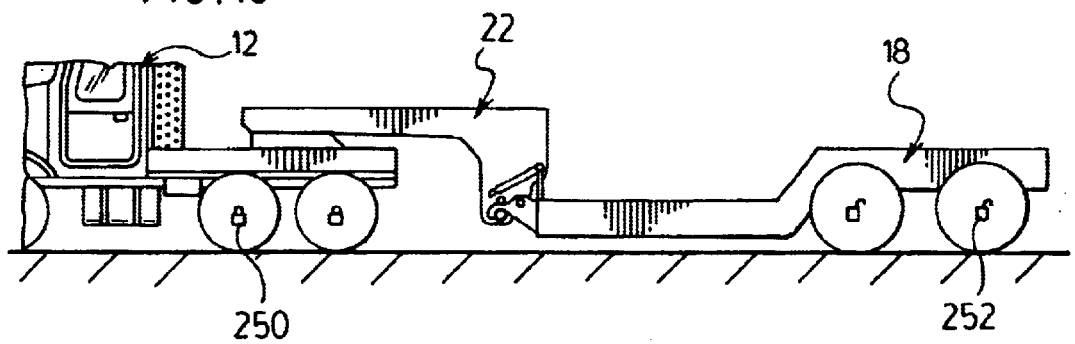
FIGS. 15 to 23 are schematic side views showing the steps for detaching of the tractor trailer attachment assembly according to the present invention.

The operation of the tractor trailer attachment assembly will now be described with reference to FIGS. 15 to 23. Referring to FIG. 15, the hook assembly 24 is coupled to the generally horizontally extending struts 52, 54 of the gooseneck 22. The paddle handle assembly 220 is in the locked position to engage the hook assembly 24 of the trailer 18. The removable safety lock pins 200, 202, 212 and 214 are installed to inhibit movement of the hook assembly 24 relative to the gooseneck 22. To prepare for detachment of the tractor trailer attachment assembly 10, air actuated park brakes are set on the wheels of the tractor 12, as indicated schematically by closed locks 250. The trailer wheels are free to rotate, as indicated schematically by open locks 252.

Figure 16:
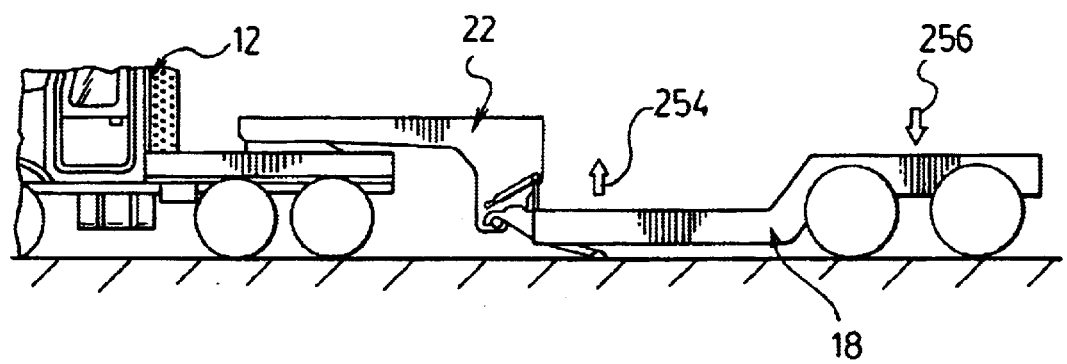
Figure 17:
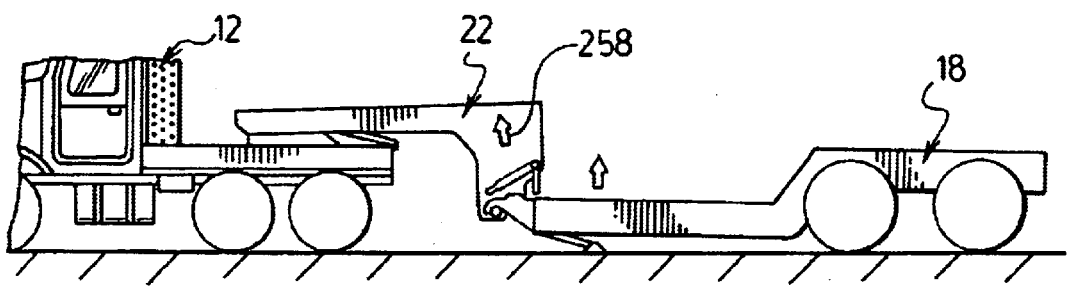

The removable safety lock pins 200, 202, 212 and 214 are then removed from the gooseneck 22, as shown in FIG. 16, and the second pneumatic assembly 140 of the trailer 18 is engaged. Air from the compressor is then fed to the inflatable bladders 168 of the second pneumatic assembly 140. The inflatable bladders 168 force the ground supports 158 to move into contact with the ground. This causes the forward end of the trailer 18 to raise, as indicated by arrow 254. As a result of the upward movement of the forward end of the trailer 18, the rear end of the trailer 18 moves slightly downward, as indicated by arrow 256.

The first pneumatic assembly 100 of the tractor 12 is engaged at the same time as the second pneumatic assembly 140 of the trailer 18. The stinger arm 102 is rotated, by inflating the bladder 110, until the stinger arm 102 rests on the tractor bed 16. Movement of the stinger arm 102 is then controlled by the operator to alternate between raising the gooseneck 22 and holding the position of the gooseneck 22 in order to maintain the gooseneck tight against the trailer 18 as the trailer 18 is raised. Upward movement of the gooseneck is indicated by arrow 258 of FIG. 17.

Figure 18:
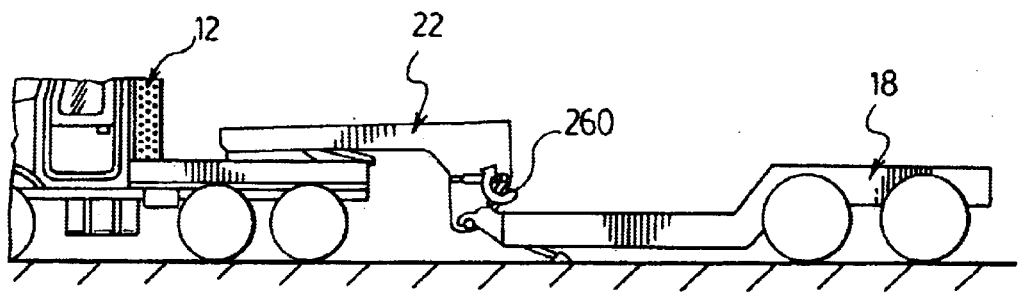

Once the trailer 18 has raised far enough to allow the locking struts of the paddle handle assemblies 220 to swing freely the first and second pneumatic assemblies 100 and 140 are held in position. The safety latch is unhooked to allow the paddle handles 222 to rotate, as shown in FIG. 18. The paddles handles 222 are rotated to shift locking struts 224 upward, as indicated by arrow 260, and the paddle handle 222 is secured in the U-bracket saddle (not shown), which is welded to the support arm to prevent the paddle from interfering with the detachment process.

Figure 19:
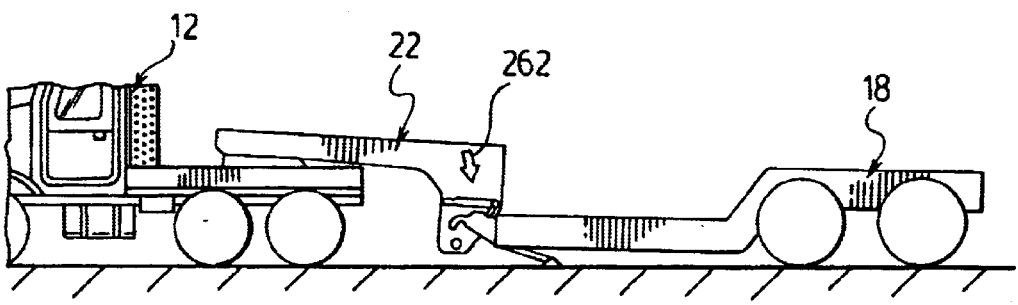
Figure 20:
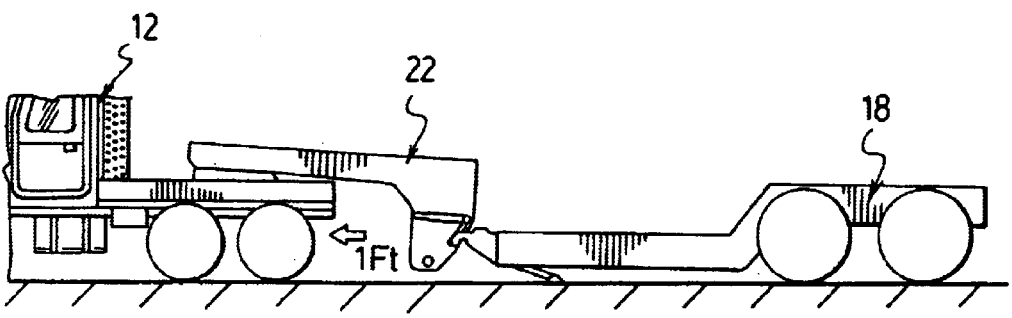

Referring to FIG. 19, air is removed from the bladder 110 of the first pneumatic assembly 100 to lower the gooseneck 22, as indicated by arrow 262. This causes the generally horizontal struts 52, 54 to move out of contact with the hooks 130, 132. The tractor 12 is then driven forward approximately 1 ft., as shown in FIG. 20.

Figure 21:
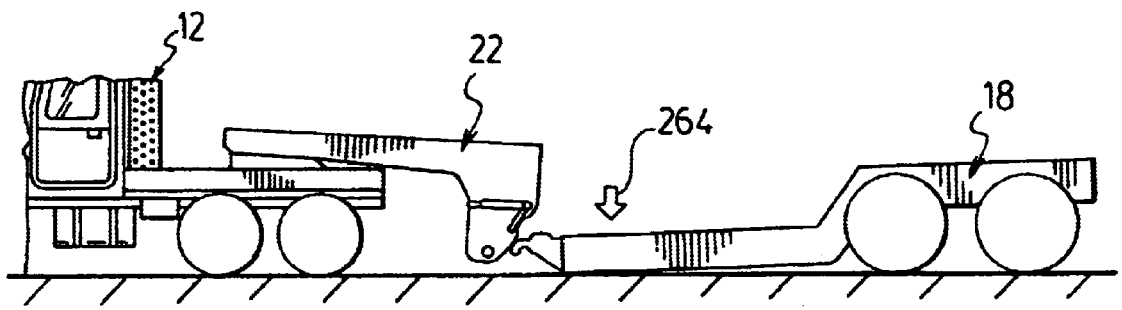
Figure 22:
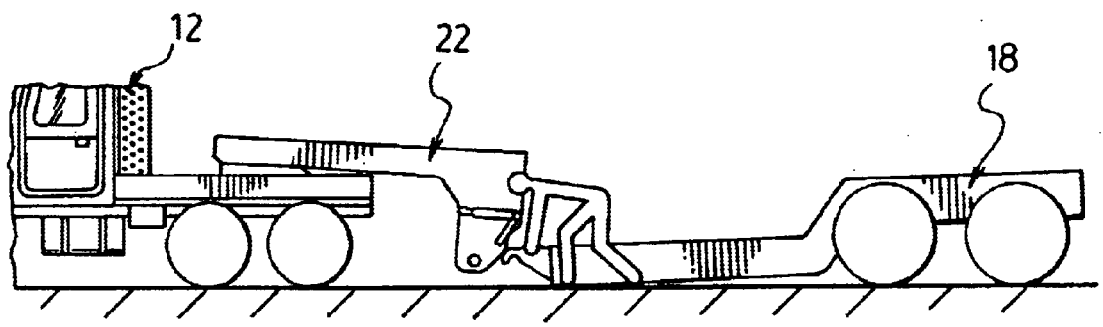

The trailer 18 is then lowered, as indicated by arrow 264 of FIG. 21. At this time, as shown by FIG. 22, the electrical connections between the tractor 12 and the trailer 18 are disconnected by the operator. In addition, all three glad hands, which are red, black and blue in colour, are disconnected. The red glad hand is temporarily connected to the black glad hand to allow the truck air compressor to replenish the air supply during loading or unloading. This minimizes the waiting time for the air when the gooseneck is re-attached.

Figure 23:
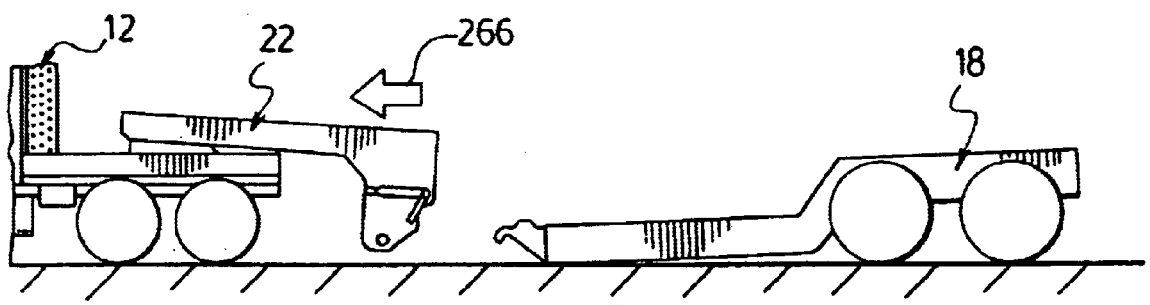

Referring to FIG. 23, the tractor 12 is then driven forward, as indicated by arrow 266. The tractor 12 is driven forward a sufficient distance to allow for the loading or unloading of equipment. In order to re-attach the tractor trailer attachment assembly 10, the above described procedure is performed in the reverse order.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A gooseneck for connecting a tractor and a trailer for transportation, said gooseneck comprising:

a support arm having a first end, said first end for coupling to a fifth wheel of said tractor, said support arm being pivotable about said first end to raise and lower a second end of said support arm relative to a tractor bed;

a generally downwardly extending portion coupled to said second end of said support arm, said generally downwardly extending portion for releasably attaching to a forward end of said trailer; and a pneumatic assembly coupled to said support arm, said pneumatic assembly being in communication with said tractor bed to raise and lower said generally downwardly extending portion relative to said tractor bed when said gooseneck is coupled to said fifth wheel, said pneumatic assembly abutting said tractor bed to raise said generally downwardly extending portion.

2. A gooseneck as claimed in claim 1, wherein said generally downwardly extending portion comprises a generally horizontally extending strut, said generally horizontally extending strut being sized for engaging a hook extending from said forward end of said trailer.

3. A gooseneck as claimed in claim 1, wherein said pneumatic assembly comprises:

a stinger arm having a first end and a second end, said first end of said stinger arm being pivotally coupled to an underside of said support arm of said gooseneck;

an enlarged stinger head coupled to a second end of said stinger arm, said enlarged stinger head for abutting said tractor bed; and an inflatable bladder coupled to said enlarged stinger head, said inflatable bladder actuable to move said support arm away from said tractor bed.

4. A tractor-trailer attachment assembly comprising:

a gooseneck for coupling to a fifth wheel of a tractor, said gooseneck having a support arm having a generally downwardly extending portion located at a distal end thereof, said generally downwardly extending portion including a generally horizontally extending strut;

a first pneumatic assembly coupled to an underside of said support arm, said pneumatic assembly being actuable to abut a tractor bed of said tractor to raise and lower said generally downwardly extending portion relative to a forward end of a trailer; and a hook assembly coupled to a forward end of said trailer, said hook assembly having a forwardly extending hook for engaging said generally horizontally extending strut of said gooseneck;

wherein said gooseneck is movable by said first pneumatic assembly to bring said generally horizontally extending strut into and out of engagement with said forwardly extending hook.

5. A tractor-trailer attachment as claimed in claim 4 further comprising a second pneumatic assembly, said second pneumatic assembly being coupled to an underside of said trailer adjacent said forward end, said second pneumatic assembly for lifting and lowering said forward end of said trailer relative to a ground surface, said second pneumatic assembly cooperating with said first pneumatic assembly to bring said generally horizontally extending strut into and out of engagement with said forwardly extending hook.

6. A tractor-trailer attachment assembly as claimed in claim 5, wherein said first pneumatic assembly comprises an expandable bladder coupled to a distal end of a pivoting arm, said pivoting arm being coupled at a first end to said underside of said support arm of said gooseneck.

7. A tractor-trailer attachment assembly as claimed in claim 5, wherein said second pneumatic assembly comprises an expandable bladder coupled to a distal end of a pivoting arm, said pivoting arm being coupled at a first end to said underside of said trailer.

8. A method for detaching a gooseneck, mounted on a tractor, from a trailer comprising:

actuating a second pneumatic assembly to move a hook assembly located at a forward end of said trailer relative to the ground, said second pneumatic assembly being coupled to said forward end of said trailer and including at least one ground support for contacting the ground to force said hook assembly of said trailer to move upwards;

actuating a first pneumatic assembly to move a generally horizontally extending strut that is coupled to a downwardly extending portion of said gooseneck, said pneumatic assembly extending between a bed of said tractor and an underside of said gooseneck; and moving said tractor away from said trailer once said hook assembly is dis-engaged from said generally horizontally extending strut.

* * * * *

UNITED STATES PATENT AND TRADEMARK OFFICE
CERTIFICATE OF CORRECTION

PATENT NO. : 6,874,803 B2
DATED : April 5, 2005
INVENTOR(S) : Randy McDougal et al.

It is certified that error appears in the above-identified patent and that said Letters Patent is hereby corrected as shown below:

Column 8,
Line 24, after "attachment" insert -- assembly --.

Signed and Sealed this

Seventh Day of June, 2005

JON W. DUDAS
*Director of the United States Patent and Trademark Office*